United States Patent [19]
Barradas

[11] Patent Number: 5,289,760
[45] Date of Patent: Mar. 1, 1994

[54] COMBINATION FOOD PROCESSOR AND FRYER

[76] Inventor: George Barradas, 15 River View Ct., Greenwich, Conn. 06830

[21] Appl. No.: 933,688

[22] Filed: Aug. 24, 1992

[51] Int. Cl.⁵ ............................................. A47J 37/12
[52] U.S. Cl. ....................................... 99/331; 99/330; 99/342; 99/353; 99/357; 99/407; 241/92; 241/282.2
[58] Field of Search ................. 99/403, 407, 409–415, 99/352, 353, 355, 357, 348, 510–513; 426/464, 518, 523, 637, 438, 473; 241/282.2, 92, 282.1, 37.5; 83/409.1, 411.2, 411.3, 411.7, 167, 665, 666

[56] References Cited

U.S. PATENT DOCUMENTS

| | | | |
|---|---|---|---|
| 3,078,786 | 2/1963 | Arvan | 99/407 |
| 3,085,607 | 4/1963 | Schottle | 99/631 |
| 3,200,737 | 8/1965 | Ferenc | 99/410 |
| 3,477,362 | 11/1969 | Peebles | 99/441 |
| 3,648,595 | 3/1972 | Morris | 99/342 |
| 3,874,259 | 4/1975 | Chambos et al. | 99/538 |
| 4,187,770 | 2/1980 | Coffield | 99/353 |
| 4,196,660 | 4/1980 | Steinberg | 99/353 |
| 4,516,733 | 5/1985 | Funagura et al. | 241/92 |
| 4,921,175 | 5/1990 | Okada et al. | 241/92 |
| 5,010,805 | 4/1991 | Ferrara | 99/357 |
| 5,065,672 | 11/1991 | Federighi, Sr. | 99/631 |

OTHER PUBLICATIONS

"The Crisp Factory," pp. 2–7, owner's manual, Customer Instructions and Cooking Guide, date unknown.

Primary Examiner—Timothy F. Simone
Attorney, Agent, or Firm—Alfred E. Miller

[57] ABSTRACT

A food fryer and processor for solid food, such as potatoes, and having a rotatable blade and a rotatable paddle for cutting the food product into segments and ejecting the segments into an adjacent perforated basket within a receptacle having hot oil therein for frying the food product. Several types of interchangeable cutter blades can be used for slicing the food product.

15 Claims, 9 Drawing Sheets

COMBINATION FOOD PROCESSOR AND FRYER

This invention relates to a motor driven solid food chopper. The cut segments fall by gravity on a rotating pusher paddle which discharges the segments into a laterally disposed receptacle. The receptacle is preferably provided with a removable perforated basket which is inserted in the receptacle having hot oil therein, so that the food segments in the basket become fried.

Previously, when it was desired to make a solid food product, such as french fried potatoes, the cook sliced a potato into pieces, usually manually, and the potato pieces were placed in a frying pan having cooking oil at the proper temperature in order to fry the potatoes. This was a two step process that was, for the most part, accomplished manually. This method was time consuming and somewhat untidy.

SUMMARY OF THE INVENTION

It is an object of the present invention to provide a self contained motor-driven unit with heating capabilities for slicing solid food products and ejecting the same into a receptacle having hot oil for frying the sliced food products.

It is a further object to provide a motor-driven solid food slicing machine having a chamber with a paddle ejector for pushing the cut slices into a laterally disposed receptacle through an opening in the chamber cover and into the receptacle.

It is another feature of the present invention to provide a cover for the chamber having a rotatable blade and rotatable paddle, the cover having an open-ended feeding tunnel, and a safety switch on the chamber which is activated when the cover is placed on the chamber over the blade and paddle whereby the motor is then operated, causing both said blade and paddle to rotate in the chamber.

An object of the present invention is to provide a heater and a thermostat for the receptacle having hot oil therein, as well as a LED indicator alerting the user when the oil has been heated up to the proper temperature.

Another feature of the present invention is to provide a storage space under the chamber for additional cutter blades which can be selectively chosen depending on whether the user is slicing thick slices, thin slices, or shearing the solid food product.

It is a further object of the present invention to make both the receptacle for the hot oil, and the perforated basket that is inserted in it, removable.

Another object of the present invention is to provide a food processor and a food fryer in a combined housing and wherein the fryer is located adjacent to by laterally displaced from the food processor.

DESCRIPTION OF THE DRAWINGS

In order that the present invention will be clearly understood, it will now be disclosed in greater detail with reference to the accompanying drawings in which.

DESCRIPTION OF THE PREFERRED EMBODIMENTS OF THE INVENTION

Figure 1:
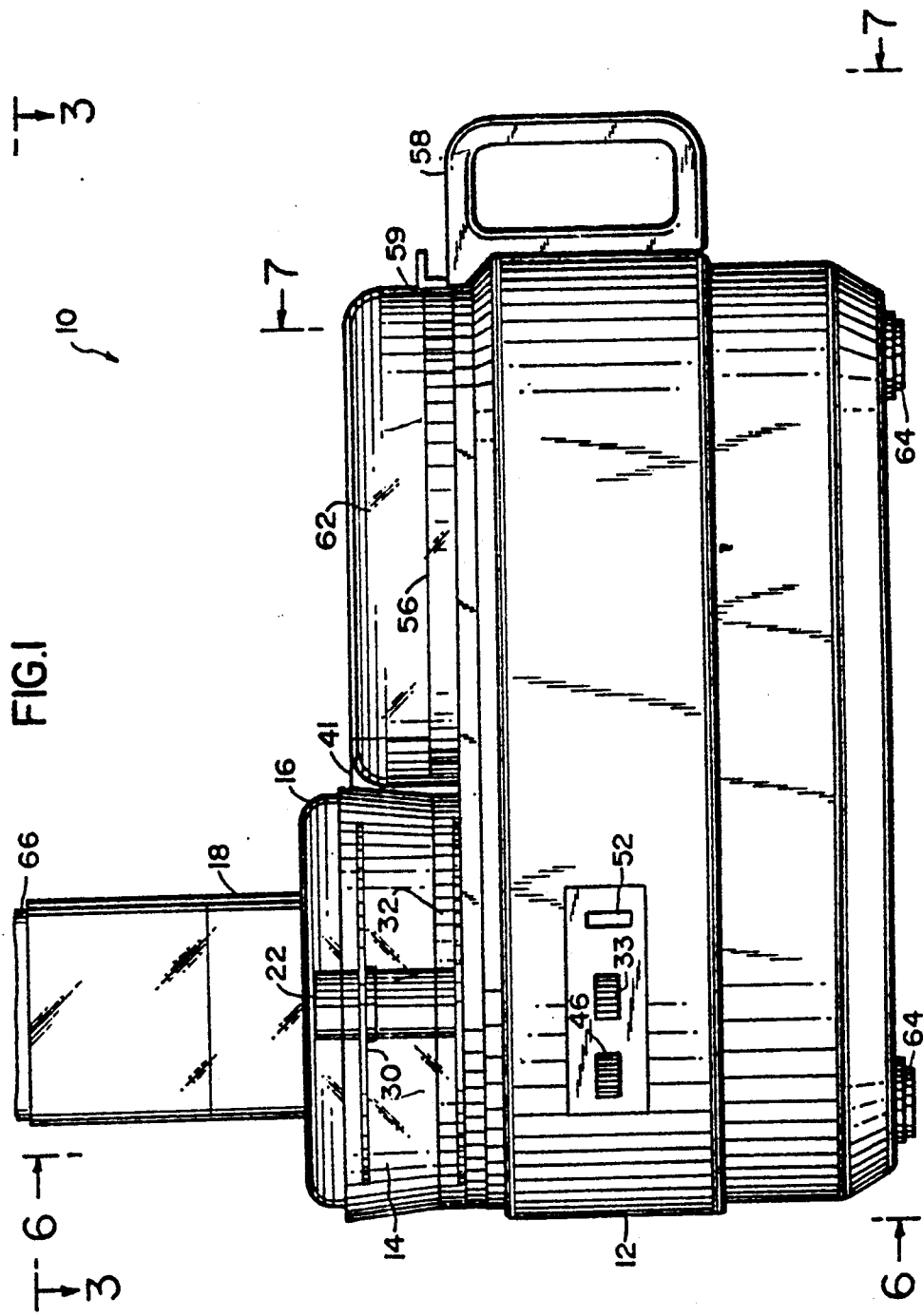
FIG. 1 is a side elevational view of the combination food processor and fryer constructed in accordance with the teachings of my invention.

The present combination comprises a solid food processor and fryer that is referred to generally by the numeral 10 and is provided with a housing 12 and an open chamber 14 having a removable, preferably transparent, cover 16. Attached to the cover 16 is a chute 18 for inserting a solid food, such as potatoes, which are inserted in the chute individually.

Figure 2:
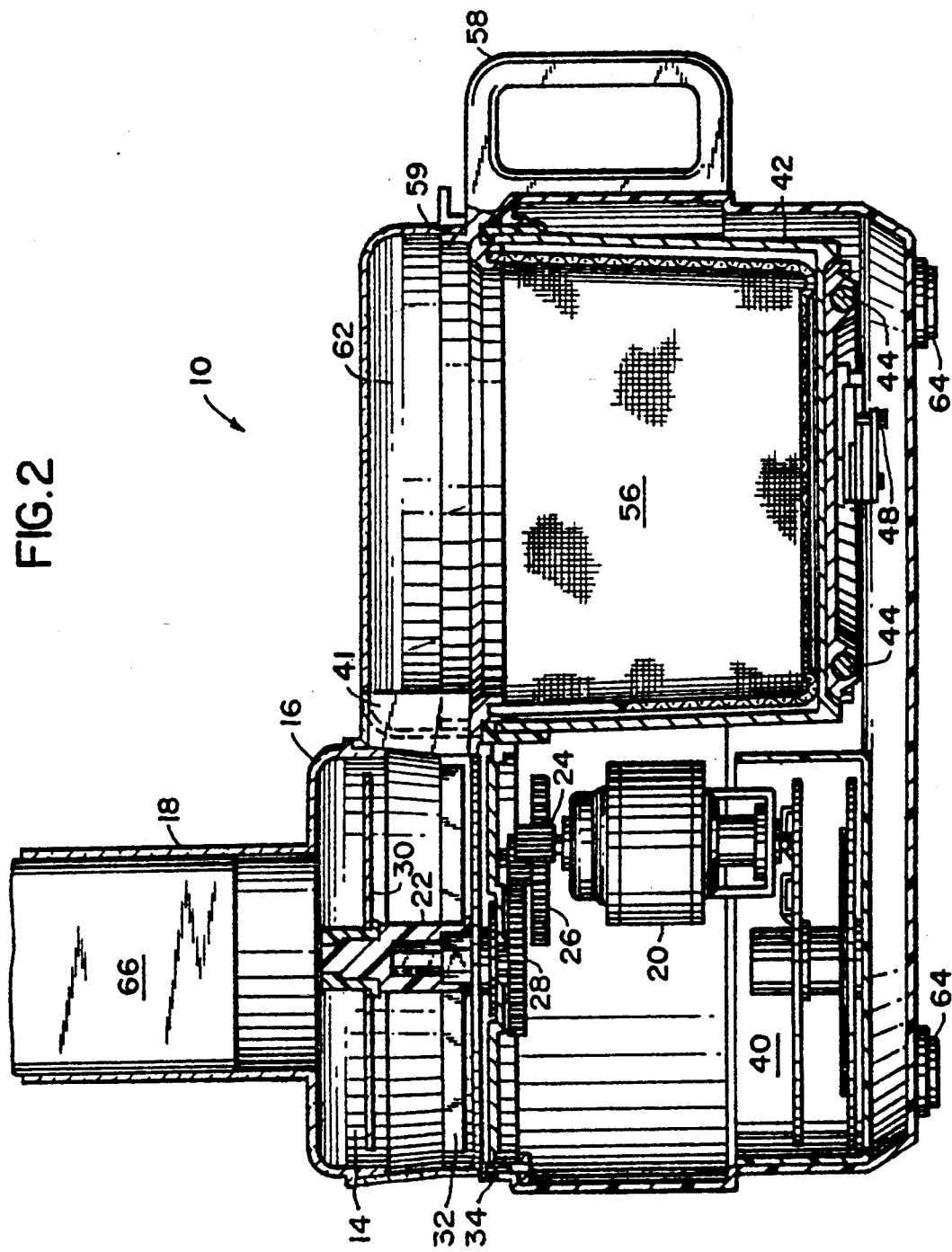
FIG. 2 is a sectional view of the food processor and fryer shown in FIG. 1.
Figure 4:
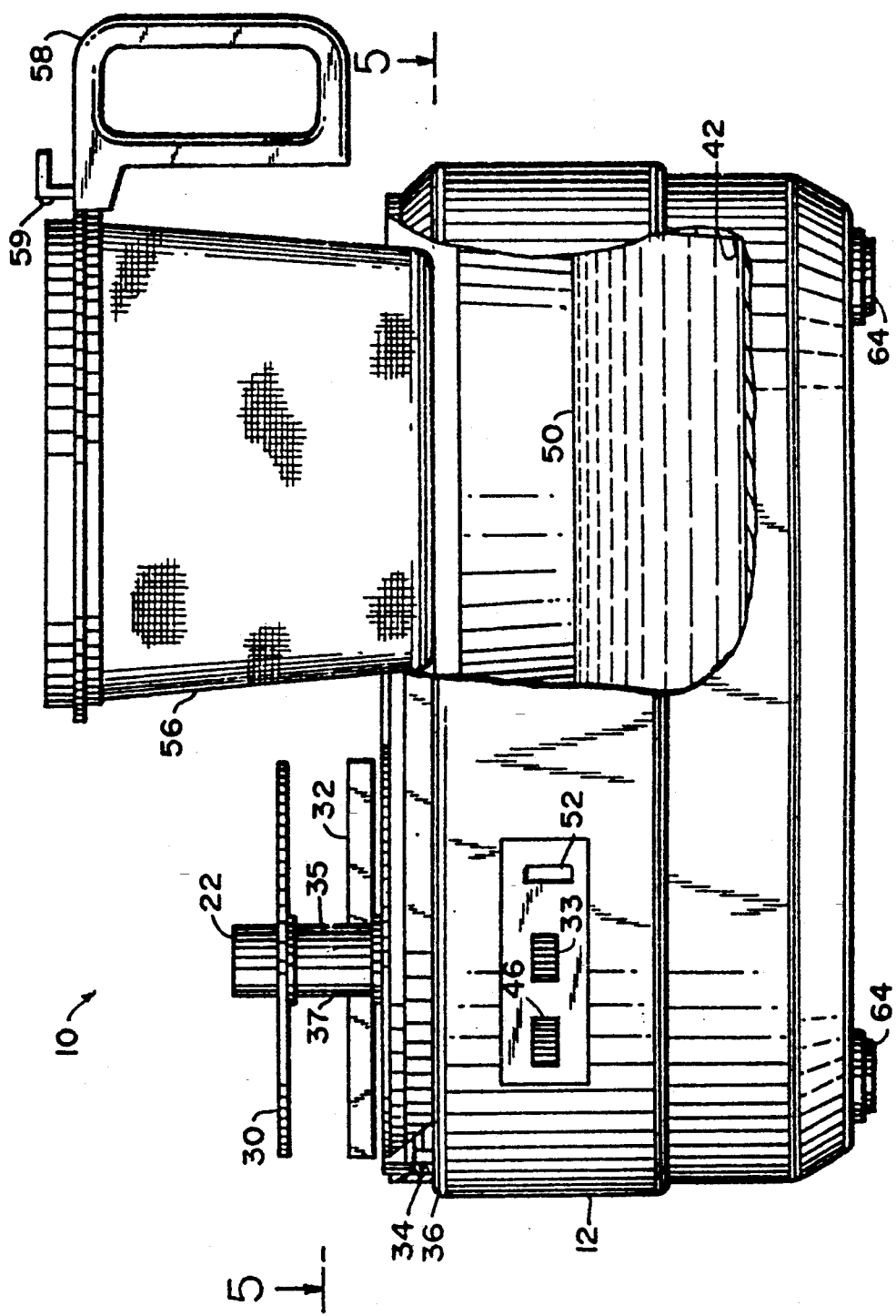
FIG. 4 is a side elevational view, with part broken away to show the hot oil in the receptacle and the chute and cover for the rotatable blade and paddle removed.

As seen in FIG. 2, a motor 20 drives shaft 22 located in the chamber 14 through gears 24, 26 and 28 respectively. As seen in FIGS. 1 and 4 a rotatable cutting blade 30 is mounted in the shaft 22. Spaced below the blade 30 is a rotatable pusher paddle 32. A motor switch 33 is located on the housing for operating the motor 20. The shaft 22 has a hollow center portion which is out of round for driving the blade and paddle, each of which has a central opening which is out-of-round.

Figure 5:
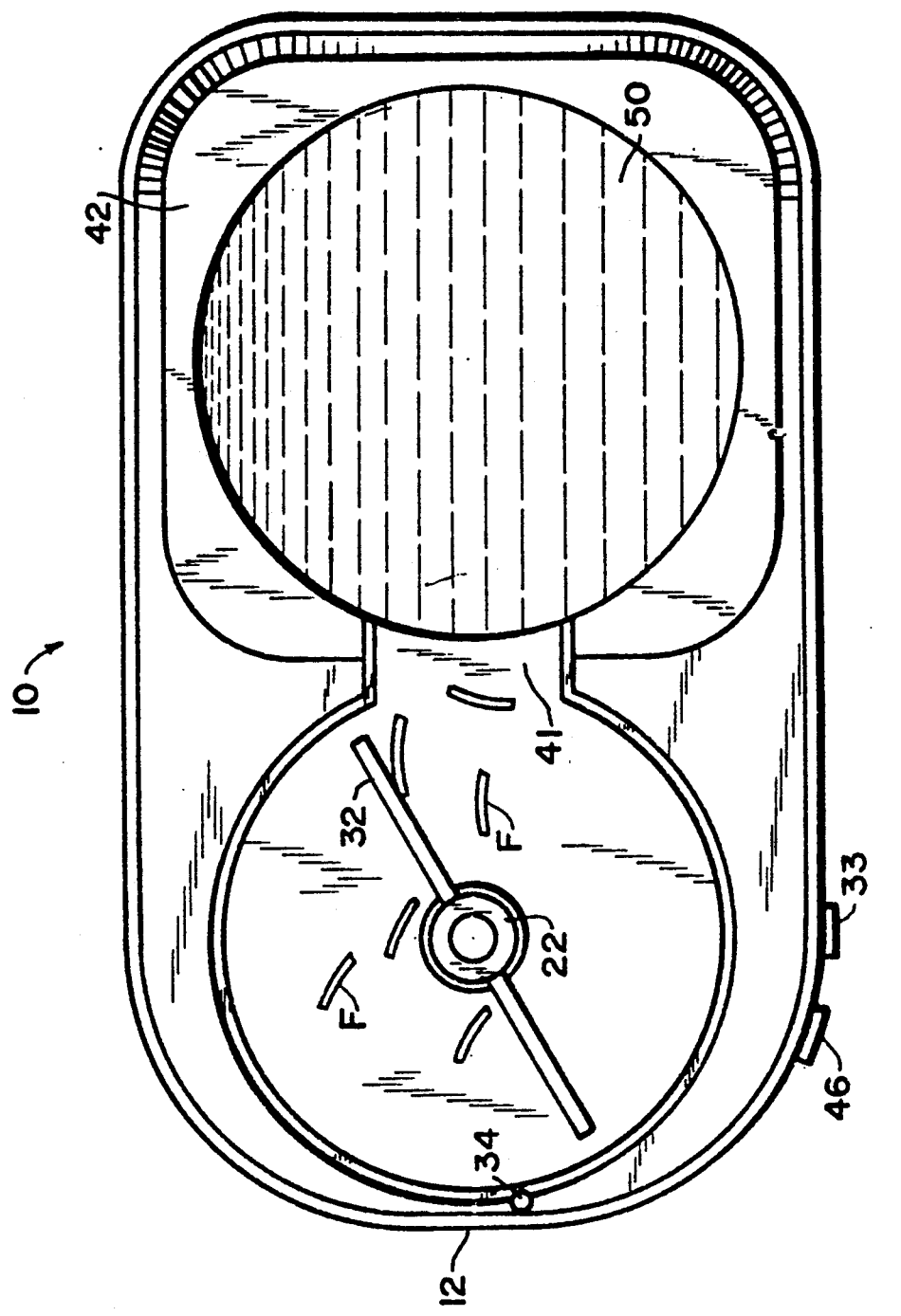
FIG. 5 is a view taken along the lines 5—5 of FIG. 4 showing the food segments being pushed by the paddle into the porous basket having cooking oil therein.

It should be noted that the cover 16 and chute 18 are integral and the cover is placed over both the cutting blade 30 and the pusher paddle 32. However, as seen in FIGS. 2, 4 and 5, a spring loaded safety switch 34 is located at the upper edge 36 of the housing 12. Consequently, only when a part of the peripheral edge of the cover 16 is pressed down on the switch 34 does it becomes activated, so that the motor switch 33 can be operated. Thus, as a safety feature, the blade 30 and the paddle 32 cannot be operated until the cover 16 is in place and the chamber 14 is closed.

Figure 3:
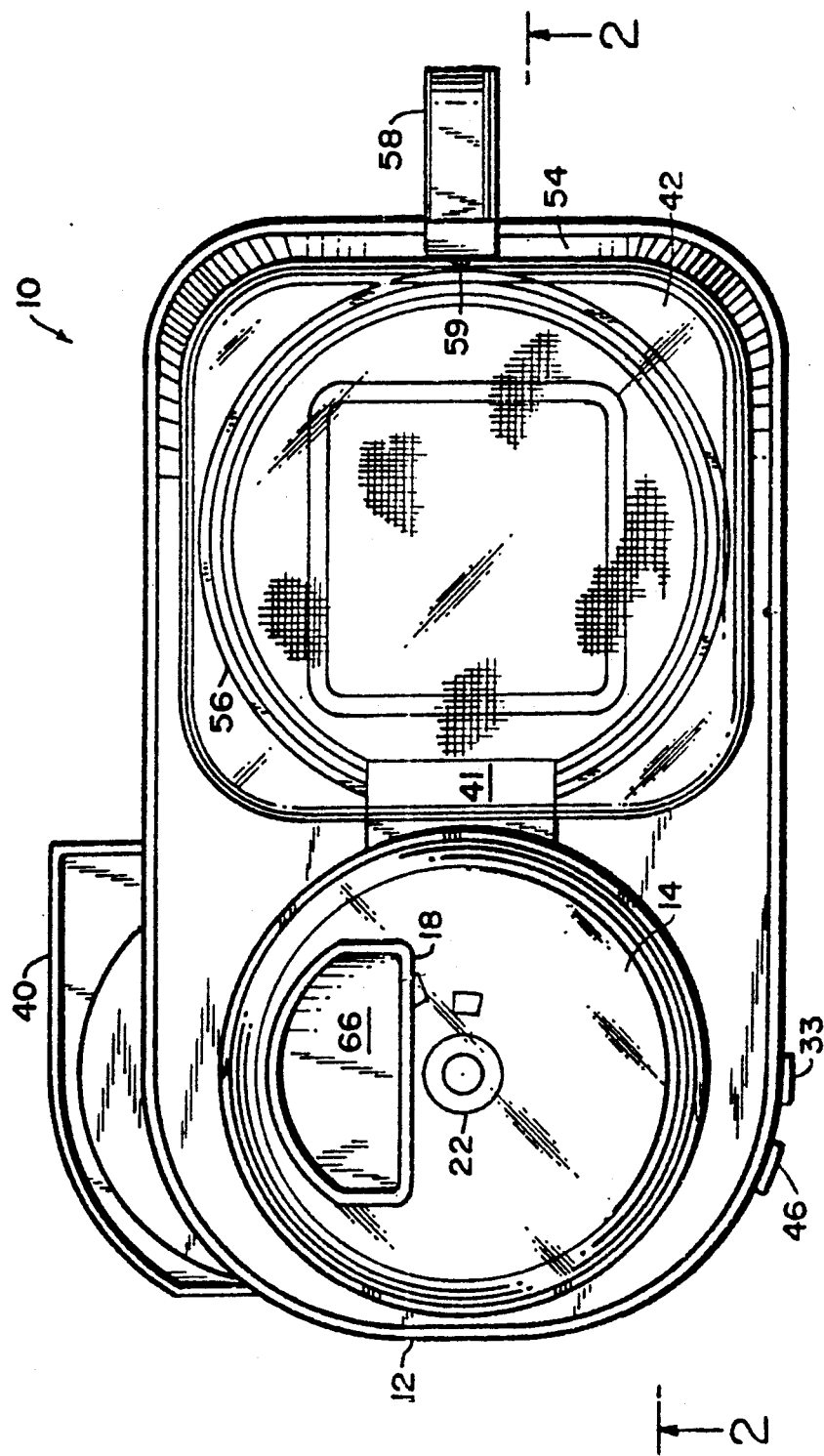
FIG. 3 is a top plan view taken along the lines 3—3 of FIG. 1.

In the rear of the lower base portion of the housing 12 is an opening 38 which functions as storage for additional cutting blades which will be described hereinafter. The cover 16, as seen in FIGS. 2 and 3, is provided with an opening 41 which connects the chamber 14 with to the receptacle 42.

Referring again to FIG. 2 of the drawings, the receptacle 42 is shown which is positioned laterally and adjacent to the chamber 14. The receptacle is removable and rests on or is attached to heating elements 44, that can be operated by power switch 46, the latter being seen in FIGS. 1 and 4. A thermostat 48 is provided for controlling the setting of the heating of, for example, cooking oil 50 which is poured into the receptacle 42. A visual signal 52, such as an LED indicator, is mounted on the exterior of the housing in order to alert the user that the cooking oil is heated up to the selected temperature for frying. An air space 54 is provided between the housing 12 and the receptacle 42 in order to prevent heat build-up on the housing part from the hot oil in the receptacle 42.

Figure 8:
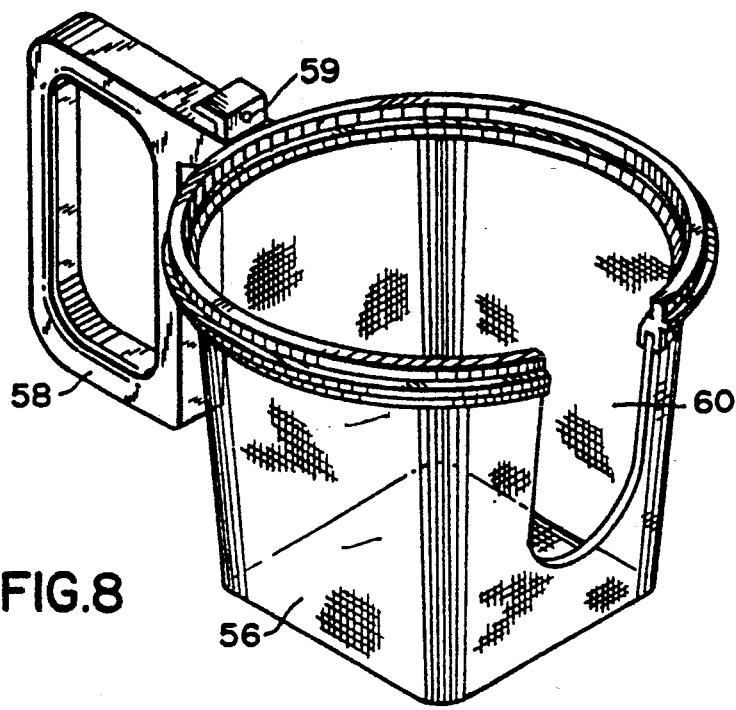
FIG. 8 is a perspective view of the perforated basket showing the front discharge opening.

When the receptacle is in use, it is provided with a perforated basket 56, with a handle 58 and a thumb rest 59 attached in a cantilever fashion. As seen in FIG. 8, the perforated basket has a front cut-out portion 60 for discharging the food segments into a bowl or container after they have been fried in cooking oil. Both the receptacle and the basket are removable from the housing.

The assembly of the receptacle 42 and the perforated basket 56 is provided with a cover 62, which is preferably transparent, so that the frying operation can be observed. The housing has rubber feet 64 for the protection of the surface that the food processor and fryer rests on.

The basket 56 can be lifted out of the receptacle 42 in the frying section of the combined processor and fryer, as seen in FIG. 4.

Figure 9:
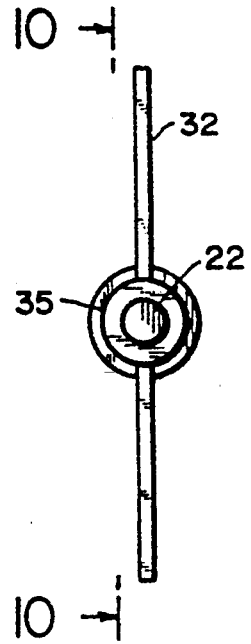
FIG. 9 is a top plan view of the pusher paddle in place over the rotatable shaft.
Figure 10:
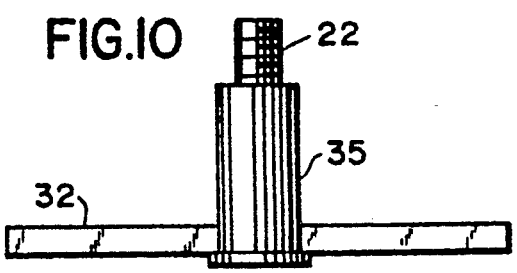
FIG. 10 is a view taken along the lines 10—10 of FIG. 9.

Referring to FIGS. 9 and 10, the pusher paddle 32 is shown as a single unit which can be inserted or removed from the motor shaft 22. The paddle 32 is provided with a cylindrical spacer element 35 upon which rests rotatable cutter blade 30 having a bearing member 37, as seen in FIG. 4.

Figure 6:
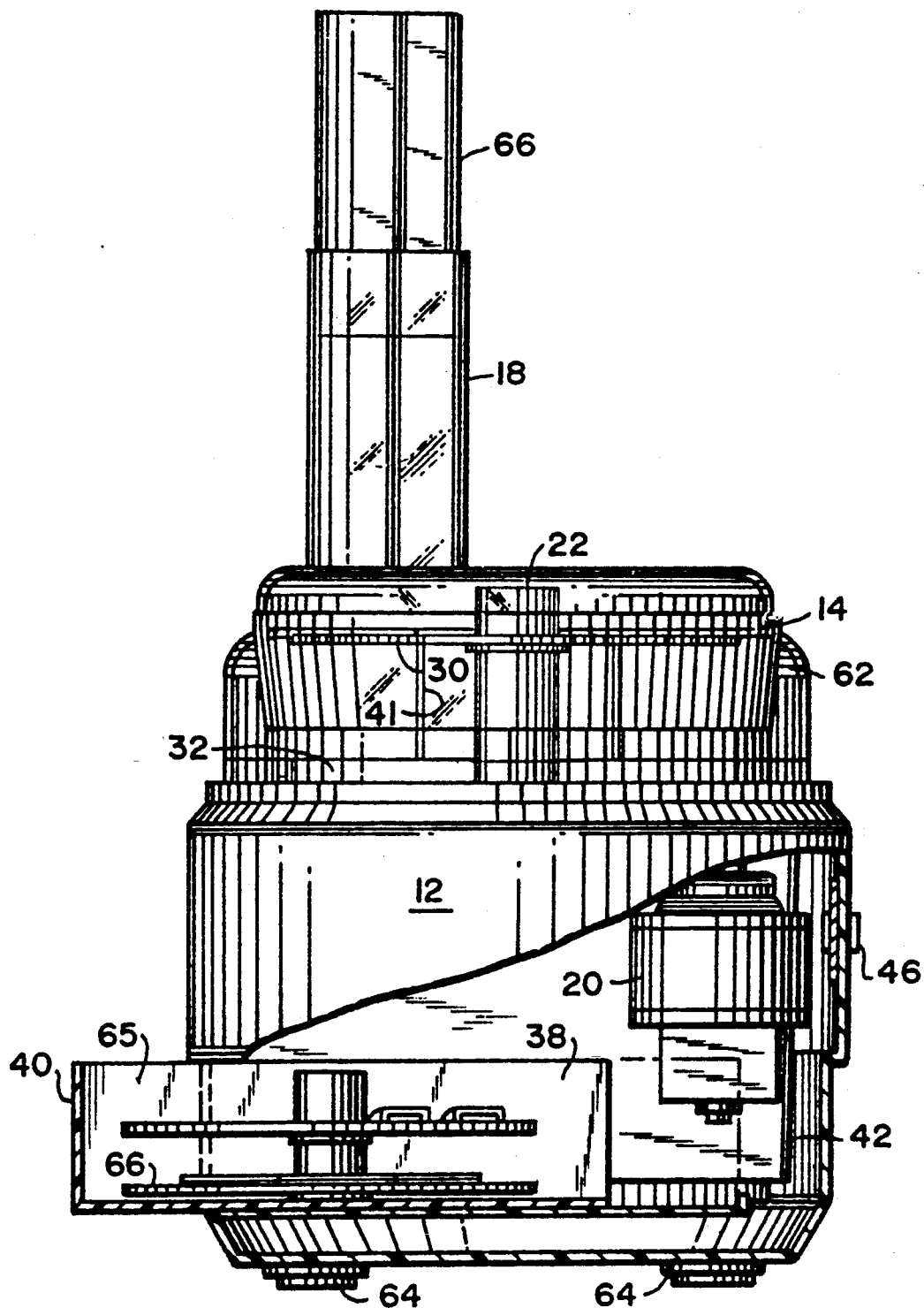
FIG. 6 is a side elevational view of the food processor side of the combination processor and fryer, being partly broken away at the base to show the extended drawer for storage of spare cutting blades.
Figure 7:
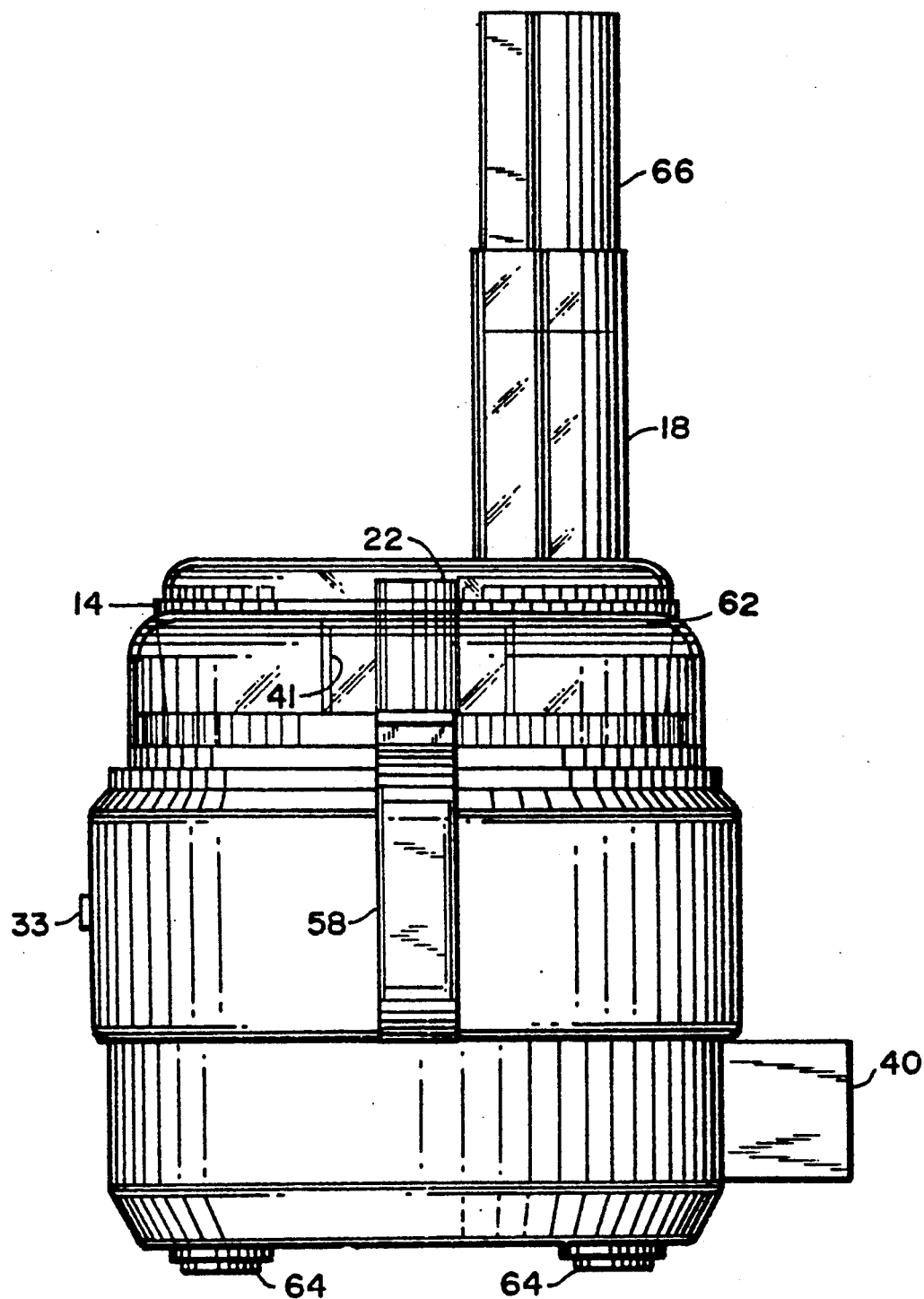
FIG. 7 is a side elevational view of the fryer side of the combination processor and fryer showing the extended drawer in the rear of the unit.
Figure 15:
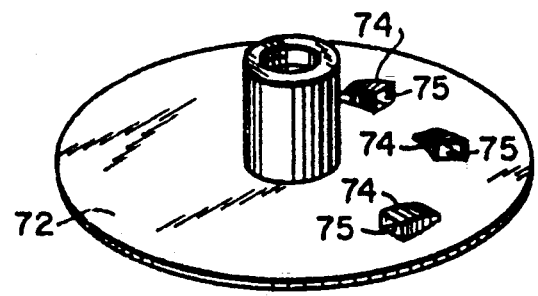
FIG. 15 is a perspective view of the cutter blade for making sliced potatoes suitable for french fries.
Figure 11:
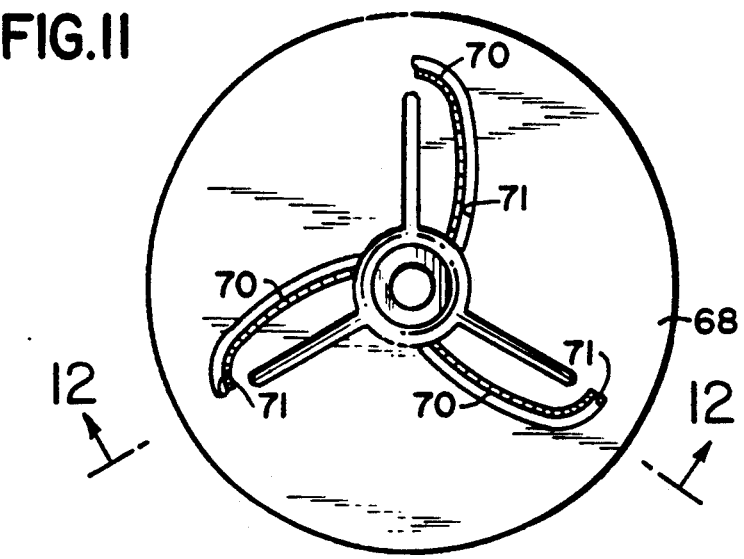
FIG. 11 is a top plan view of the cutter blade for shaving a potato into thin potato slices suitable for making potato chips.
Figure 12:
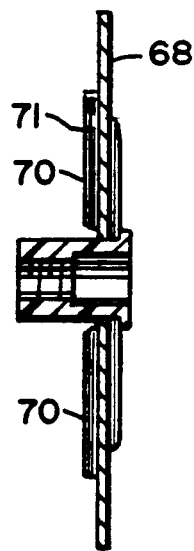
FIG. 12 is a view taken along the lines 12—12 of FIG. 11.
Figure 13:
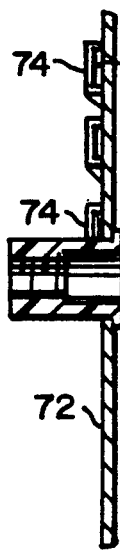
FIG. 13 is another type of rotatable cutter for slicing a potato into the form for making french fried potatoes.
Figure 14:
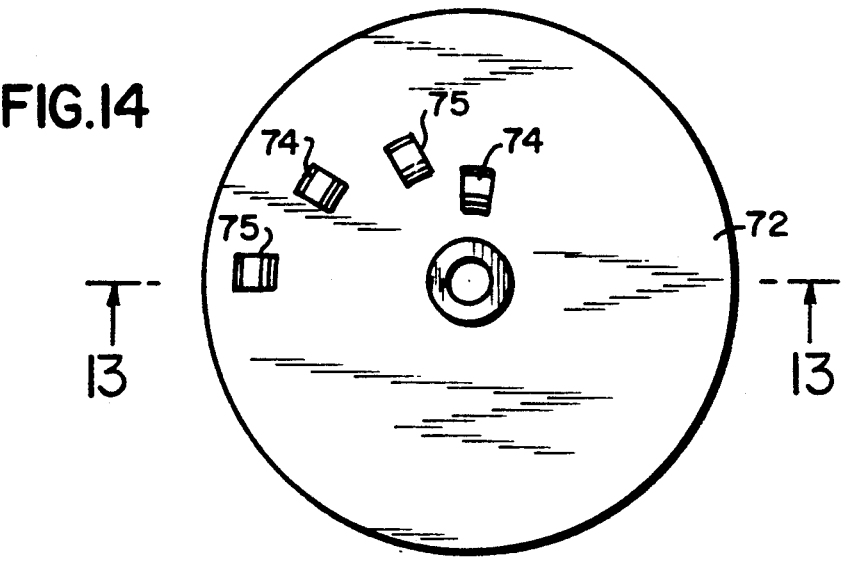
FIG. 14 is a cross-sectional view taken along the lines 13—13 of FIG. 14.

There are two types of rotatable cutter blades, as shown in FIGS. 11-14. These cutter blades are preferably housed in the rear pull-out drawer 40, as seen in FIGS. 6 and 7, and are thus easily accessed for use. As seen in FIGS. 11 and 12, a cutter plate 68 is shown having slightly raised cutting edges 70 above the surface area of the cutter plate. The cutting edges 70 are curved and each have a complementary though opening 71 in front of the respective cutting edge. This cutter blade is designed to make thin slices from a potato which are suitable for making potato chips. In FIGS. 13, 14 and 15, another type of cutter blade 72 is shown having raised and inverted u-shaped cutting edges 74 which are staggered along the surface of the cutting blade so as to contact substantially all of the surface of a whole potato in order to slice the potato into long, thin substantially rectangular shaped slices which are suitable for making french fried potatoes. Each of the cutting edges 74 is provided with a complimentary through opening 75 for shaping the potato slices and forcing the potato slices through the opening and underneath the cutter blade 72 into contact with the rotating paddle 32, as seen in FIG. 5, for french frying. All the blades shown in FIGS. 9-14 are so constructed and keyed to fit over the rotatable motor shaft 22 and are therefore rotatable by the motor 20.

When it is desired to use this combination product, one places a solid food item, such as a whole potato, in the chute 18. A plunger 66 can be utilized in order to force the whole solid food item against the rotating cutting blade 30. The cut segments or slices of the food product drop by gravity in the chamber 14 and are engaged by the rotating pusher paddle 32, as seen in FIG. 5, and ejected through the housing opening 41 in the chamber 14, and into the receptacle 42. The receptacle is provided with cooking oil 68, preferably to the level shown in FIG. 4. The oil has been heated to the required temperature by heaters 44 located below the receptacle 42. When the food slices are fried they can be removed from the hot oil remaining in the receptacle by lifting the perforated basket 56 by its handle 58 and removing the contents thereof, with the cooking oil dripping back into the receptacle through the perforations in the basket 56. The fried food items can be discharged or dumped out of the basket cut-out portion 60 into a suitable plate or container.

While the present invention has been disclosed and described with reference to certain embodiments thereof, it is apparent that other variations in the embodiments may be made which fall within the true scope of the invention as defined in the following claims, for example, other types of rotatable cutting blades may be used for shredding solid food products, as well as slicing the same.

What I claim is:

1. A motor-driven solid food processor and fryer comprising: a housing, a chamber in said housing having a cutting blade, a pusher paddle in said chamber spaced from said cutting blade, a receptacle for cooking oil in said housing, a removable perforated basket in said receptacle, means for heating said cooking oil to a predetermined temperature, means communicating said chamber with said receptacle whereby food is inserted in said chamber and cut into segments, said food segments being engaged by said paddle which pushes said cut segments through said communicating means into the basket within the receptacle wherein said receptacle and basket have hot oil therein in order to fry said food segments.

2. A motor-driven solid food processor comprising: a housing, a chamber in said housing having a cutting blade, a cover for said chamber, a pusher paddle in said chamber spaced from said cutting blade, a removable receptacle in said housing laterally spaced from said chamber, an opening in a side of said cover, communicating said chamber with said receptacle whereby food is inserted in said chamber and cut into segments, said food segments being engaged by said paddle which pushes said cut segments through said opening in the cover into the laterally spaced receptacle.

3. A motor-driven solid food fryer and processor as claimed in claim 1 wherein said cutting blade is positioned above said pusher paddle whereby said cut food segments fall by gravity onto said pusher paddle.

4. A foood fryer and processor as claimed in claim 1 wherein said food segments are potatoes.

5. A food fryer and processor as claimed in claim 1 wherein said basket is provided with a cut-out portion in the front therof for discharging the fried food segments from the basket.

6. A food fryer and processor as claimed in claim 3 wherein said receptacle is an oil container and further comprising a heater and a thermostat for said oil container.

7. A food processor as claimed in claim 2 wherein said cutter blade rotates, and further comprising a funnel communicating with said chamber whereby when solid food is pushed down said funnel said food engages said cutting blade.

8. A food fryer and processor as claimed in claim 1 further comprising a storage space underneath said chamber for holding cutting blades.

9. A food fryer and processor as claimed in claim 1 further comprising a removable cover for said cutting blade and pusher paddle having a chute at one end for inserting the solid food to be cut, a safety switch being activated only when said cover is in place over said cutting blade and pusher paddle, and a motor switch which can only become operative when said safety switch is activated.

10. A food fryer and processor as claimed in claim 1 further comprising a visual signal on said housing which alerts the user when the hot oil is at the required temperature for frying.

11. A food fryer and processor as claimed in claim 1 wherein said receptacle is positioned laterally from said chamber and said chamber having a housing facing opening facing said receptacle which is said means communicating with said chamber whereby the cut food segments are ejected through said opening and into said basket having hot oil at least partly therein.

12. A food processor and fryer as claimed in claim 1 wherein said cutting blade is provided with spaced curvilinear, elongated and slightly raised cutting edges for cutting thin slices of potatoes suitable for potato chips.

13. A food processor and fryer claimed in claim 1 wherein said cutting blade is provided with staggered inverted U-shaped cutting edges for slicing potatoes to a configuration suitable for making french fried potatoes.

14. A food processor and fryer as claimed in claim 1 further comprising a shaft operated by said motor, said cutting blade and pusher paddle being rotated on said shaft with the cutting blade positioned over the pusher paddle, and both said blade and paddle being removable from said shaft.

15. A food processor and fryer as claimed in claim 1 further incorporating means for heating said cooking oil to a predetermined temperature in order to fry said food segments.

* * * * *